United States Patent [19]

Tobin

[11] Patent Number: 5,129,574
[45] Date of Patent: Jul. 14, 1992

[54] BRAZE BONDING OF OXIDATION-RESISTANT FOILS

[75] Inventor: Albert G. Tobin, Smithtown, N.Y.

[73] Assignee: Grumman Aerospace Corporation, Bethpage, N.Y.

[21] Appl. No.: 656,440

[22] Filed: Feb. 19, 1991

[51] Int. Cl.$^5$ .................... B23K 35/24; B23K 103/02; B23K 103/14; B23K 35/38
[52] U.S. Cl. .............................. 228/221; 228/263.14; 228/263.21
[58] Field of Search ............... 228/221, 263.21, 263.14

[56] References Cited

U.S. PATENT DOCUMENTS 3,148,953  9/1964  Goto ............................... 228/263.21
3,849,865  11/1974  Gedwill et al. ................. 228/263.13
4,869,421  9/1989  Norris et al. .................... 228/263.21

FOREIGN PATENT DOCUMENTS 59-137187  8/1984  Japan .............................. 228/263.21

OTHER PUBLICATIONS

W. J. Lewis et al., "Brazing Titanium to Titanium and to Mild and Stainless Steels," WADC Tech. Report 52-313, Part 2; Oct. 3, 1968.
Metals Handbook, Desk Edition, Metals Park, Ohio, 1985; Section 15.2, Table 2.

*Primary Examiner*—Kurt Rowan
*Assistant Examiner*—Jeffrey T. Knapp
*Attorney, Agent, or Firm*—Pollock, Vande Sande & Priddy

[57] ABSTRACT

A ductile oxidation-resistant foil is joined to a titanium alloy substrate by means of a silver-based braze alloy. The braze alloy acts as a bonding agent to join the oxidation-resistant foil to the titanium alloy substrate.

8 Claims, 1 Drawing Sheet

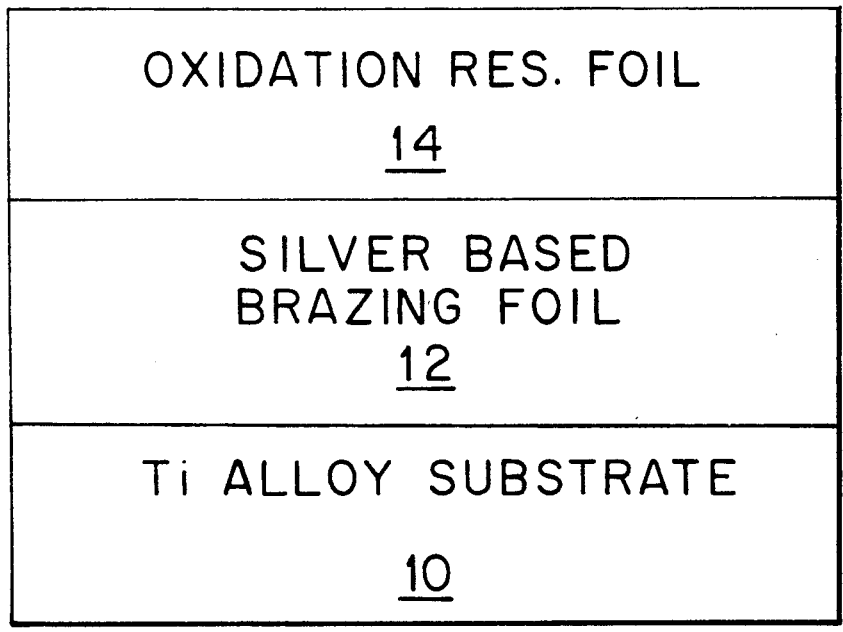

| OXIDATION RES. FOIL |
| :---: |
| 14 |
| SILVER BASED BRAZING FOIL |
| 12 |
| Ti ALLOY SUBSTRATE |
| 10 |

# BRAZE BONDING OF OXIDATION-RESISTANT FOILS

FIELD OF THE INVENTION

The present invention relates to oxidation protection of titanium materials, and more particularly to the utilization of braze bonding of protective foils on titanium materials.

RELATED CO-PENDING APPLICATIONS

The following co-pending applications relate to protective coatings for titanium alloys and aluminides: Ser. No. 07/656,433 filed Feb. 19, 1991, which issued as U.S. Pat. No. 5,049,418 on Sep. 17, 1991; Ser. No. 07/656,453 filed Feb. 19, 1991; and Ser. No. 07/656,495 filed Feb. 19, 1991.

BACKGROUND OF THE INVENTION

Titanium aluminides suffer from the inability to form a self-protective oxidation-resistant barrier on exposure to an oxidizing environment. This is because the alloy tends to form mixed oxide scales that tend to crack upon thermal cycling and form a complex layered oxide that spalls. In addition, the oxide film that is in contact with the metal substrate dissolves some of the oxygen from the oxide scale. This leads to diffusion of oxygen from the surface into the metal substrate and subsequent embrittlement.

In the case of a metal matrix composite (MMC) consisting of high strength filaments embedded in the metal matrix, additional complications arise due to internal stresses generated by the mismatch in thermal expansion between fiber and matrix. This leads to crack formation at the surface during cyclic oxidation, crack propagation into the metal matrix and eventual mechanical failure of the composite.

BRIEF DESCRIPTION OF THE PRESENT INVENTION

In order to provide an oxidation-resistant surface on titanium alloys that does not degrade the mechanical properties of the baseline material, it is necessary to provide a ductile surface layer that will bond to the aluminide and that forms a protective surface oxide on exposure to an oxidizing environment. This can be accomplished by bonding a ductile foil of an alloy that has a low solubility and diffusivity for oxygen and forms a protective oxide on exposure to an oxidizing environment. An examination of candidate alloys that will fit these requirements suggests that thin alloy foils of FeCrAl, FeNiCr, NiCrAl, and NiCr as well as the corresponding additions of yttrium to these alloys would be effective in providing the required oxidation resistance.

Specifically, the oxidation-resistant foils are bonded to a titanium alloy substrate by means of a brazing operation. A commercially available silver-based braze alloy is obtained in the form of a foil and is sandwiched between the titanium alloy substrate and an oxidation-resistant foil. However, other braze alloys may be used (e.g. titanium or gold). The layer assembly of foils and substrate are subjected to brazing temperatures and pressure until excellent bonding between the foils and the titanium alloy substrate is produced.

BRIEF DESCRIPTION OF THE FIGURE

The above-mentioned objects and advantages of the present invention will be more clearly understood when considered in conjunction with the accompanying drawing, in which:

the FIGURE is a diagrammatic illustration of a brazed oxidation-resistance foil accomplished by the method of the present invention.

DETAILED DESCRIPTION OF THE INVENTION

A substrate 10 of Ti alloy, such as titanium aluminide is the layer requiring oxidation protection as previously discussed. An oxidation-resistant foil 14 provides that protection and it becomes bonded to the substrate 10 by means of a silver-based brazing foil 12. Other braze foils, such as titanium or gold, may also be used. An oxidation-resistance foil 14 may have a thickness ranging 0.0005–0.003 inch. One of a number of commercially available silver-based brazed alloys is employed as foil 12 and has a thickness ranging 0.001–0.003 inch. The following Table 1 lists a representative number of commercially available silver-based braze alloys.

TABLE 1

| | Braze Alloy Selection | | |
|---|---|---|---|
| Name | Composition | Liquidus (°C.) | Solidus (°C.) |
| InCusil | 62Ag—27Cu—9.5In—1.5Ti | 755 | 625 |
| TiCuSil | 68.8Ag—26.7Cu—4.5Ti | 850 | 830 |
| Ag | 100Ag | 960 | 960 |
| TiCuNi | 70Ti—15Cu—15Ni | 925 | 880 |
| Gapasil9 | 82Ag—9Pd—9Ga | 880 | 845 |

In order to fabricate the coating-protected substrate, the assembly of layers shown in the FIGURE is placed in a vacuum oven and a dead weight, exerting a pressure of 1–5 p.s.i. is placed on the assembly to obtain intimate contact between the layers during a brazing operation. Evacuation pressure of at least $10^{-4}$ Torr is necessary. Brazing temperatures are determined by the properties of the brazed alloy. Table 1 gives the typical properties of the commercially available silver-based braze alloys used for this operation. The solidus temperature sets the upper use temperature for the brazed composite in the oxidizing environment. Typical brazing times vary from 1–5 minutes. Furthermore, it is also desirable that the braze alloy exhibit some oxidation resistance at the use temperature if edge or end effects are to be avoided.

The following Table 2 illustrates observations of the interfacial reaction obtained as a result of the brazing operations.

TABLE 2

| Materials Combinations | | |
|---|---|---|
| Oxidation Res. Foil | Braze Foil | Observation |
| FeCrAl | Gapasil9 | Significant Diffusion of Ga,Pd into Aluminide; Limited Diffusion into Foil |
| FeCrAl | Silver | Significant Ag Diffusion into TiAl; Minimal Ag Diffusion into Foil |
| FeCrAl | TiCuSil | Significant Cu Diffusion into TiAl; Minimal Diffusion in Foil |
| FeCrAl | TiCuNi | Ni and Cu Diffusion in TiAl; Small Diffusion Zone in Foil |
| NiCr | Gapasil | Dissolution of Ni,Cr in Braze; Segregation of Pd and Ga to TiAl Interface |
| NiCr | TiCuSil | Dissolution of Ti in Braze; Diffusion of Cu,Ag into NiCr and TiAl |
| NiCr | InCusil | Dissolution of Ti,Al in Braze; |

TABLE 2-continued

| Materials Combinations | | |
|---|---|---|
| Oxidation Res. Foil | Braze Foil | Observation |
| | | Diffusion of In,Cu and Ag into NiCr and TiAl |

This Table demonstrates that different combinations of braze alloy and ductile foil were investigated. It was generally observed that the brazing operation led to significant diffusion of the brazing alloy elements into the aluminide. The FeCrAl foils exhibited little reaction with the braze while significant interaction with the NiCr foils was observed. On this basis it was concluded that the FeCrAl foil offers better potential for forming a surface protection system for the substrate 10.

A number of elemental distributions for brazed foils were plotted and they demonstrated that, although significant metallurgical interactions can occur during a brazing operation, excellent bonding between the foils and the titanium alloy substrate will result. Further research will be needed to determine what, if any, effects the braze has on mechanical properties of the titanium alloy.

In summary, the present method produces a ductile oxidation-resistant surface for titanium alloys by using silver-based or other metal based (e.g. gold, titanium) braze alloys as the bonding agent to join an oxidation-resistant foil to a titanium alloy substrate. The present method has the advantage of producing a ductile oxidation-resistant surface for titanium alloys which upper use temperature, in an oxidizing environment, is determined by the solidus temperature of the braze alloy.

It should be understood that the invention is not limited to the exact details of construction shown and described herein for obvious modifications will occur to persons skilled in the art.

I claim:

1. A method for protecting a substrate of titanium material fox oxidation comprising the steps:

depositing a foil of braze material on the surface of a substrate to be oxidation-resistant protected;

depositing an oxidation-resistant foil on the braze foil to form an assembly;

evacuating the space around the assembly to create a vacuum of at least $10^{-4}$ Torr;

applying a pressure of 1-5 psi to the surface of the oxidation-resistant foil to insure intimate contact between the foil and substrate; and applying sufficient heat treatment (i.e., temperature and time) to the assembly for brazing the oxidation-resistant layer to the substrate.

2. The method set forth in claim 1 wherein the substrate is titanium alloy.

3. The method set forth in claim 2 wherein the substrate is titanium aluminide.

4. The method set forth in claim 1 wherein the oxidation-resistant foil is FeCrAl.

5. A method set forth in claim 1 wherein the brazing foil is a metal-based braze alloy material chosen from the group including silver, gold, and titanium.

6. A method for protecting a titanium alloy or aluminide substrate from oxidation comprising the steps:

depositing a braze foil of silver-based braze alloy on the surface of a substrate to be oxidation-resistant protected;

depositing an oxide-resistant foil of FeCrAl on the braze foil to form an assembly;

evacuating the space around the assembly to below $10^{-4}$ Torr to create a vacuum;

applying a pressure of 1-5 psi to the surface of the oxidation-resistant foil to insure intimate contact between the foil and substrate during the brazing operation; and applying sufficient heat treatment to the assembly for brazing the oxidation-resistant layer to the substrate.

7. The method set forth in claim 6 wherein the thickness of the braze foil is 0.001-0.003 inch.

8. The method set forth in claim 6 wherein the thickness of the oxidation-resistant foil is 0.0005-0.003 inch.

* * * * *